US012594813B2

(12) United States Patent
Paes et al.

(10) Patent No.: US 12,594,813 B2
(45) Date of Patent: Apr. 7, 2026

(54) SYSTEMS AND METHODS FOR DYNAMIC CLIMATE CONTROL

(71) Applicant: Rivian IP Holdings, LLC, Plymouth, MI (US)

(72) Inventors: Paulo Lucena Kreppel Paes, Irvine, CA (US); Dewashish Prashad, Irvine, CA (US); Ean Joshua Hall, Costa Mesa, CA (US); Ajay Panekkad, Laguna Niguel, CA (US); Siddartha Gangula, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 562 days.

(21) Appl. No.: 18/089,675

(22) Filed: Dec. 28, 2022

(65) Prior Publication Data

US 2024/0067129 A1 Feb. 29, 2024

Related U.S. Application Data

(60) Provisional application No. 63/402,730, filed on Aug. 31, 2022.

(51) Int. Cl.
| | |
|---|---|
| *B60H 1/00* | (2006.01) |
| *B60H 1/32* | (2006.01) |
| *B60S 1/02* | (2006.01) |
| *B60S 1/54* | (2006.01) |

(52) U.S. Cl.
CPC ..... *B60H 1/00742* (2013.01); *B60H 1/00764* (2013.01); *B60H 1/00785* (2013.01); *B60S 1/026* (2013.01); *B60S 1/54* (2013.01); *B60H 1/00835* (2013.01); *B60H 1/3207* (2013.01)

(58) Field of Classification Search
CPC ........... B60H 1/00742; B60H 1/00764; B60H 1/00785; B60H 1/00835; B60H 1/3207; B60S 1/026; B60S 1/54
See application file for complete search history.

(56) References Cited

U.S. PATENT DOCUMENTS

| | | | | |
|---|---|---|---|---|
| 6,347,746 B1 * | 2/2002 | Dage | ...................... | G05D 22/02 |
| | | | | 236/44 C |
| 8,694,205 B1 * | 4/2014 | Yerke | ................. | B60H 1/00864 |
| | | | | 701/36 |
| 2001/0032470 A1 * | 10/2001 | Remond | ............ | B60H 1/00785 |
| | | | | 62/133 |
| 2002/0166332 A1 * | 11/2002 | Kelly | ................... | B60H 1/3207 |
| | | | | 62/176.6 |
| 2005/0115255 A1 * | 6/2005 | Wang | ................. | B60H 1/00864 |
| | | | | 236/44 C |

(Continued)

OTHER PUBLICATIONS

Mola, S., et al., "Equivalent temperature estimator using mean radiant temperature sensor," Measurement and Control, vol. 34, No. 6, Jul. 2001, pp. 167-169.

*Primary Examiner* — Kamini S Shah
*Assistant Examiner* — Zachary Andrew Cain
(74) *Attorney, Agent, or Firm* — HG Law LLP

(57) ABSTRACT

Methods and systems are provided for managing cabin conditions. A fogging metric and a breath temperature metric are determined. A control signal response is generated based on the fogging metric and the breath temperature metric. The system facilitates modification to the operation control of the at least one climate control device based on the control signal response.

20 Claims, 9 Drawing Sheets

500

(56)                    References Cited

U.S. PATENT DOCUMENTS

2009/0039170 A1*   2/2009  Burns ............... B60H 1/00785
                                                    236/44 A
2013/0255930 A1*  10/2013  Prakah-Asante .. B60H 1/00807
                                                    165/203

* cited by examiner

SYSTEMS AND METHODS FOR DYNAMIC CLIMATE CONTROL

CROSS-REFERENCE TO RELATED APPLICATION

This application claims priority to U.S. Provisional Patent Application No. 63/402,730, filed on Aug. 31, 2022, the contents of which are hereby expressly incorporated by reference in their entirety.

INTRODUCTION

The present disclosure is directed to dynamic climate control and, more particularly, to detecting and responding to fogging conditions, breath temperature, or both.

SUMMARY

In some embodiments, the present disclosure is directed to systems and methods for detecting or estimating fogging conditions. For example, the system may determine an extent or probability of fogging, which may provide an indication of visibility at a windshield or window, based on solar flux, ambient temperature, cabin temperature, air flow rate, relative humidity or dew point temperature, vehicle speed, or a combination thereof.

In some embodiments, the present disclosure is directed to systems and methods for determining a response for, and responding to, fogging conditions. For example, in some embodiments, the system determines the response based on a fogging metric, which may be determined based on available sensor signals.

In some embodiments, the present disclosure is directed to systems and methods for detecting or estimating breath temperature. For example, breath temperature may provide an indication of occupant comfort, and may be estimated based on available temperature sensor signals, air flow rate, duct door positions, any other suitable conditions, or any combination thereof.

In some embodiments, the present disclosure is directed to systems and methods for determining a response for, and responding to, breath temperature. For example, in some embodiments, the system determines the response based on a temperature metric, such as a breath temperature estimate, which may be determined based on available sensor signals.

In some embodiments, the present disclosure is directed to systems and methods for managing fogging conditions and breath temperature of a vehicle interior. In some embodiments, the method, as implemented by control circuitry of the system, includes determining a fogging metric for an interior of the vehicle, determining a breath temperature metric associated with one or more passengers within the interior, generating (e.g., based on the fogging metric and the breath temperature metric) a control signal response to modify an operational control of at least one climate control device associated with the vehicle, and facilitating modification to the operation control of the at least one climate control device based on the control signal response.

In some embodiments, determining the fogging metric includes determining a relative humidity corresponding to a windshield of the vehicle, determining a temperature corresponding to the windshield, determining a solar flux corresponding to the windshield, or determining a blower duty cycle, or combinations thereof. In some embodiments, determining the fogging metric is based on a dewpoint temperature corresponding to a windshield, a temperature corresponding to the windshield, and a temperature gradient corresponding to the windshield.

For example, the temperature gradient is determined based on a solar flux and a cabin air flow rate. In some embodiments, determining the control signal response based on the fogging metric and the breath temperature metric includes classifying the fogging metric based on a predetermined classification scheme. For example, one or more ranges defined by values of the fogging metric may be used to classify the fogging metric. In some embodiments, determining the control signal response based on the fogging metric and the breath temperature metric includes determining a response metric based on a functional relationship with the fogging metric. In some embodiments, the functional relationship is exponential. In some embodiments, the operational control includes a blower duty cycle, a heater temperature, a compressor speed, or an air system duct door position, or combinations thereof.

In some embodiments, determining the breath temperature metric includes determining a radiant temperature, determining an air temperature for the vehicle interior, or determining a convection metric for the vehicle interior. In some embodiments, the breath temperature metric includes a difference between a target breath temperature and an estimated breath temperature. In some such embodiments, the method includes determining the control signal response based on the fogging metric and the breath temperature metric by determining a heat demand metric, determining a heating rate, and determining at least one of a blower duty cycle or a target air discharge temperature, or combinations thereof.

In some embodiments, the method includes facilitating modification to the operational control at least one climate control device by controlling at least one of a blower, a resistance heater, a compressor, or an actuated duct door, or combinations thereof.

In some embodiments, determining the control signal response includes, for a first climate control device of the at least one climate control device, determining a first response based on the fogging metric, determining a second response based on the breath temperature metric, and comparing the first response to the second response. For example, the method may include comparing the first response and second response and determining which is greater.

In some embodiments, the method includes receiving a plurality of sensor signals from a plurality of sensors, which include at least one temperature sensor, at least one relative humidity sensor, a solar flux sensor, and a vehicle speed sensor.

In some embodiments, the system includes control circuitry and at least one climate control device, wherein the control circuitry is configured to implement the method. For example, in some embodiment, a non-transitory computer-readable medium includes instructions encoded thereon that when executed by control circuitry cause the control circuitry to determine the fogging metric for the vehicle interior, determine the breath temperature metric for the vehicle interior, generate the control signal response based on the fogging metric and on the breath temperature metric, and facilitate modification to the operation control of the at least one climate control device based on the control signal response.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DESCRIPTION

Heating, ventilation, and air conditioning (HVAC) systems may include smarter (e.g., more sensors, adjustability, and/or response), more dynamic, and more integrated vehicle systems, which may be associated with a greater need for accurate estimations and optimal control strategies to efficiently actuate the system towards optimal thermal comfort and ensure cabin view clearing (e.g., defogging). One main challenge is to estimate the highly complex physics that may dictate the system performance, while relying on readily available signals and smoothly actuating system responses over a wide range of conditions. In some circumstances, a system may be configured to use more complex data-driven models, complex lookup tables, additional sensors, or a combination thereof. In some embodiments, the present disclosure is directed to methods and systems for managing view clearing and breath temperature based on available sensors and climate control devices, along with physics-based models.

To illustrate, climate control may subdivided into (i) view clearing control, and (ii) temperature control, and the requested system response may be determined as the maximum output of either control block.

View clearing control, for example, may use distinct ranges of a fogging metric (e.g., a fog factor) to diagnose a severity of windshield fog formation and then dictate a defogging system response based on one or more response functions that smoothly capture mild to aggressive responses.

Temperature control, for example, may implement an energy balance at cabin and/or component levels that dictate the target temperature and volumetric flow rate targets to ensure transient and steady cabin thermal comfort. For example, the cabin temperature feedback and a breath temperature estimation model may be used to ensure stability of the system with minimal dependence on calibration parameters.

In an illustrative example, the present disclosure may be directed to usage of physics-based models that take as input signals from sensors readily available in vehicles. In some embodiments, this approach may improve tradeoffs between reducing cost of additional sensors and maximizing accuracy and efficiency of cabin climate control for comfort and view clearing.

Figure 1:
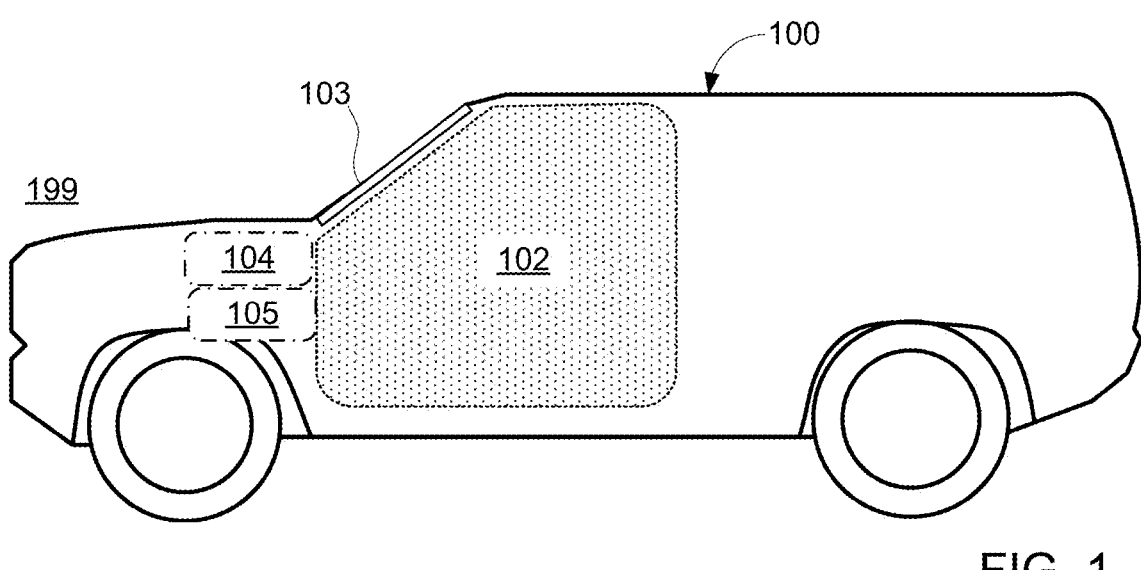
FIG. 1 shows a side view of an illustrative vehicle having a cabin controller, in accordance with some embodiments of the present disclosure.
Figure 2:
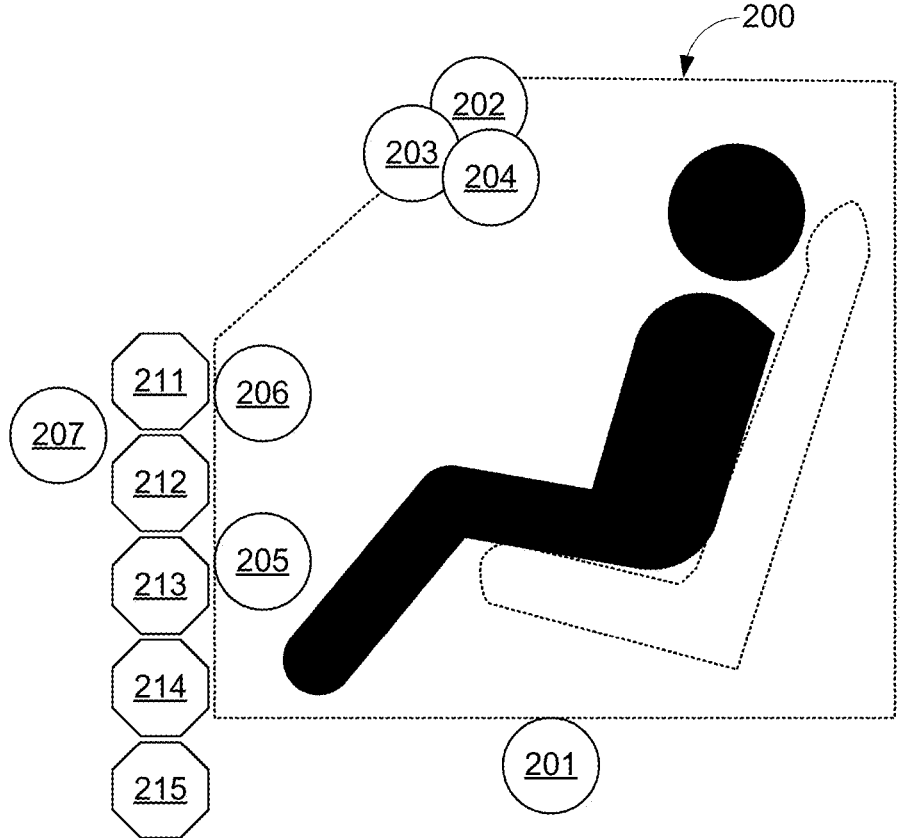
FIG. 2 shows a side view of an illustrative vehicle interior, with corresponding inputs and outputs for the cabin controller of FIG. 1, in accordance with some embodiments of the present disclosure.

FIG. 1 shows a side view of illustrative vehicle 100 having cabin controller 104 (e.g., for controlling cabin system 105), in accordance with some embodiments of the present disclosure. As illustrated, vehicle 100 includes vehicle interior 102 (also referred to herein as a "cabin") that includes an interior volume of vehicle 100 and may, for example, correspond to an occupant compartment. In some embodiments, the vehicle interior 102 corresponds to a portion of the vehicle interior (e.g., the area around the driver). Vehicle 100 includes cabin controller 104 that is configured to control cabin system 105, which may include a blower, a refrigeration cycle (e.g., having a compressor, evaporator, condenser, and throttle valve), duct doors (e.g., actuatable duct doors), a heater (e.g., an ohmic heater configured to generate heat based on current flow and a resistive element), any other suitable climate control device, or any combination thereof. In an illustrative example, a user may be located in vehicle interior 102 (e.g., in a seat) and may set a desired temperature. Cabin controller 104 may receive the desired temperature and determine a response based on fogging conditions at windshield 103, an estimated temperature (e.g., a breath temperature) in vehicle interior 102, environmental conditions 199 (e.g., temperature, pressure, humidity, precipitation), any other suitable information, or any combination thereof. In response, cabin controller 104 may adjust or otherwise control the blower, refrigeration cycle (e.g., a compressor thereof), duct doors (e.g., via an actuator), a heater (e.g., by controlling current flow), any other suitable climate control device, or any combination thereof FIG. 2 shows a side view of illustrative vehicle interior 200, with corresponding inputs and outputs for cabin controller 104, in accordance with some embodiments of the present disclosure. Vehicle interior 200 may correspond to vehicle interior 102 of vehicle 100 of FIG. 1, for example, and inputs and outputs may correspond to cabin controller 104 and/or cabin system 105 of FIG. 1. As illustrated in FIG. 2, the cabin controller (e.g., cabin controller 104) may be associated with the following inputs and outputs:

Illustrative Inputs 291 (e.g., based on sensor signals or user inputs)

201—Vehicle speed (e.g., as measured by an encoder on a motor shaft or drive shaft);

202—Solar Flux (e.g., as measured by an irradiance sensor such as an absorption sensor);

203—Windshield Relative Humidity (e.g., an electro-chemical sensor, or otherwise a sensor based on resistance, capacitance, or temperature);

204—Windshield Temperature (e.g., a thermocouple, thermistor, RTD, or other sensor);

205—Cabin Temperature (e.g., a thermocouple, thermistor, RTD, or other sensor);

206—Setpoint Temperature (e.g., as received at an interface such as a user interface); and 207—other suitable inputs (e.g., evaporator temperature, blower speed, compressor speed, duct door positions as measured or sensed).

Illustrative Outputs 292 (e.g., operational controls)

211—Cabin Flow Rate (e.g., as adjusted by a speed of a blower motor);

212—Discharge Temperature (e.g., leaving the cabin system 105);

213—Compressor Speed (e.g., of a refrigeration cycle for AC and defrosting);

214—HVAC Door Positions (e.g., doors that may be actuated to adjust openings); and 215—PTC heater current (e.g., to achieve a target heating rate).

In an illustrative example, cabin controller 104 may take as input any or all of illustrative inputs 291, determine a response based on the input, and then cause one or more climate control devices to achieve the desired output at least partially (e.g., the climate control device might reach a target value or otherwise may tend towards the target value based on characteristics of the system). In some embodiments, cabin controller 104 may detect fogging conditions, detect temperature conditions, or both, and then determine a response based on the fogging conditions, temperature conditions, or a combination thereof.

Figure 3:
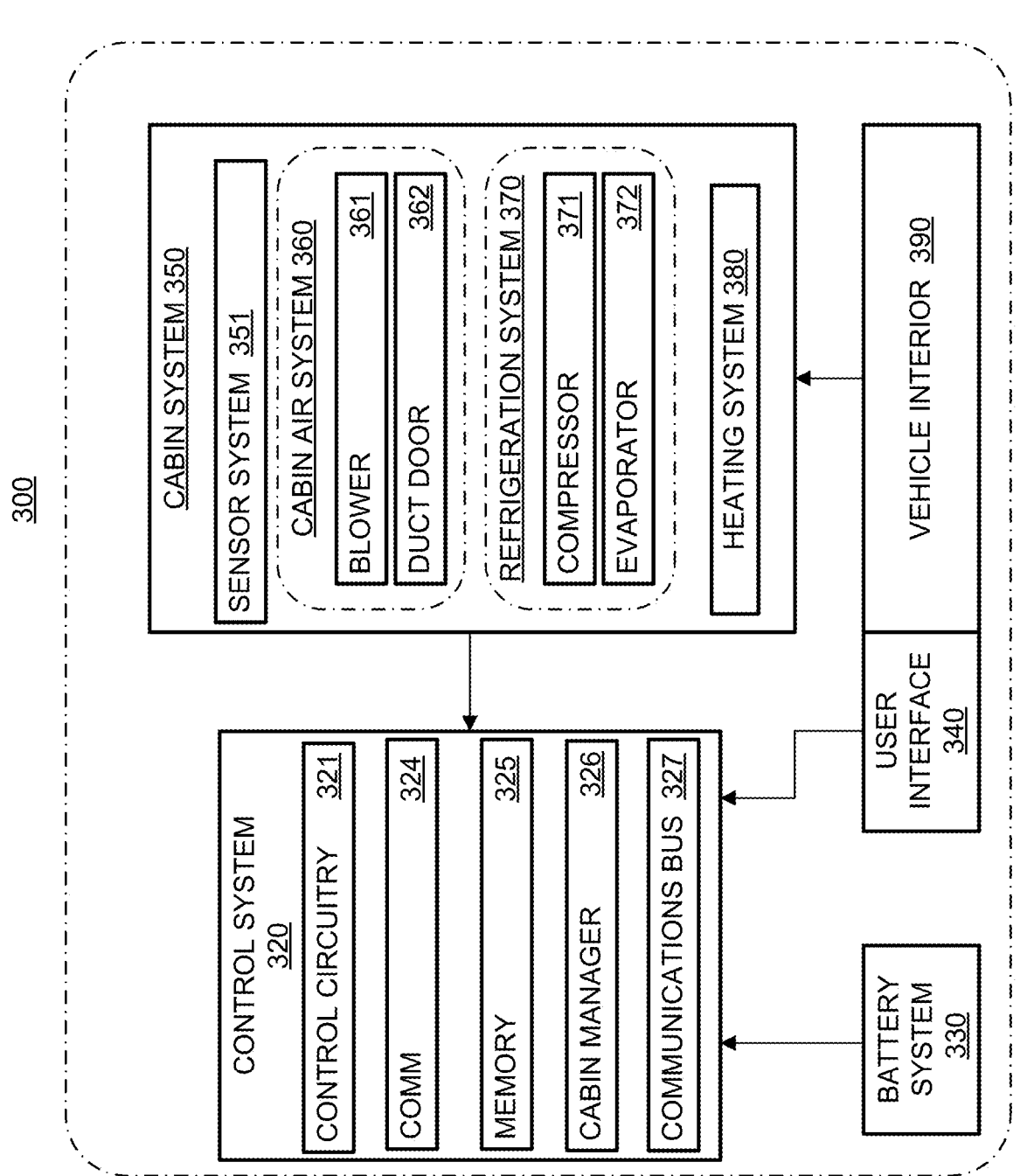
FIG. 3 shows a block diagram of an illustrative system for managing cabin conditions of a vehicle, in accordance with some embodiments of the present disclosure.

FIG. 3 shows a block diagram of illustrative system 300 for managing cabin conditions of a vehicle, in accordance with some embodiments of the present disclosure. As illustrated, system 300 (e.g., which may be included in vehicle 100 of FIG. 1) includes control system 320 (e.g., the same as cabin controller 104 of FIG. 1), user interface 340, battery system 330, cabin system 350 (e.g., similar to or the same as cabin system 105 of FIG. 1), and vehicle interior 390 (e.g., the same as vehicle interior 200 of FIG. 1, or vehicle interior 102 of FIG. 1).

Control system 320, as illustrated, includes control circuitry 321 (e.g., as implemented by one or more electronic control units or ECUs), communications interface 324 (comm 324), memory 325 (e.g., configured to store computer instructions), communications bus 327, and optionally cabin manager 326. Control circuitry 321 may include a processor, a communications bus (e.g., in addition to or instead of communications bus 327), memory (e.g., in addition to or instead of memory 325), power management circuitry, a power supply, any suitable components, or any combination thereof. Memory 325 may include solid state memory, a hard disk, removable media, any other suitable memory hardware, or any combination thereof. In some embodiments, memory 325 is non-transitory computer readable media configured to store computer instructions that, when executed, perform at least some steps of any of processes 400, 500, 600, 700, 800, or 900 described in the context of FIGS. 4-9. In some embodiments, instructions are preprogrammed into memory 325, memory of one or more ECUs, or a combination thereof, for managing cabin system 350 or aspects thereof, determining vehicle information (e.g., including vehicle operating information), determining or receiving status updates, receiving and processing input from a user, or a combination thereof (e.g., as performed by cabin manager 326). In some embodiments, the instructions are loaded or otherwise provided to control circuitry 321 to manage cabin system 350, determine a fogging metric, determine a breath temperature metric, determine a response, generate a control signal, or a combination thereof. To illustrate, cabin manager 326 may be implemented by control circuitry 321, operate separately but in communication with control circuitry 321 (e.g., via communications bus 327), or a combination thereof.

Control system 320 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, control system 320 includes or otherwise is coupled to user interface 340, which may include, for example, a screen, a touchscreen, a touch pad, a keypad, one or more hard buttons, one or more soft buttons, a microphone, a speaker, any other suitable components, or any combination thereof. For example, in some embodiments, user interface 340 includes all or part of a dashboard, including displays, dials and gauges (e.g., actual or displayed), soft buttons, indicators, lighting, and other suitable features. In a further example, user interface 340 may include one or more hard buttons arranged at the exterior of the vehicle, interior of the vehicle (e.g., at the dash console), or at a dedicated keypad arranged at any suitable position. In a further example, user interface 340 may be configured to receive input from a user device (e.g., a smartphone), haptic input from a user, or both.

Comm 324 may include one or more ports, connectors, input/output (I/O) terminals, cables, wires, a printed circuit board, control circuitry, any other suitable components for communicating with other units, devices, or components, or any combination thereof. In some embodiments, control system 320 (e.g., ECUs thereof) is configured to control a drivetrain (e.g., control an engine, electric motor, transmission, brake), cooling system, cabin system, braking system, autonomous control system, steering system, suspension system, control or manage battery system 330, determine or receive information, communicate with other units, perform any other suitable actions, or any combination thereof. In some embodiments, comm 324, user interface 340, or both, may be configured to send and receive wireless information between control system 320 and external devices such as, for example, a remote system (e.g., a server, a WiFi access point), a vehicle charger, a user device (e.g., a user device such as a smart phone), keyfobs, any other suitable devices, or any combination thereof. In some embodiments, communications bus 327 is integrated with comm 324 (e.g., communicatively coupling ECUs, and user interface 340). In some embodiments, communications bus 327 may be coupled to comm 324.

Battery system 330 may include, for example, a vehicle battery pack that may include a plurality of battery cells. For example, battery system 330 may include battery cells, busbars, current collectors, enclosures, DC bus cables or otherwise conductors, contactors, switches, sensors and instrumentation, any other suitable components, or any combination thereof.

As illustrated, cabin system 350, which may be the same as cabin system 105, includes sensor system 351 (e.g., including one or more sensors and/or a sensor interface) and climate control devices such as cabin air system 360, refrigeration system 370, and heating system 380. Cabin air system 360 is configured to pressurize and direct air flow to the cabin (i.e., vehicle interior 390) and includes blower 361 and one or more duct doors 362. Blower 361 may include an electric motor and a fan and may be configured to cause air to flow through cabin air system 360, directed by one or more duct doors 362 to regions of the cabin, dash, floor, windshield, console, or a combination thereof. For example, control system 320 (e.g., control circuitry 321 or cabin manager 326 thereof) may generate control signals for controlling a motor of blower 361 (e.g., controlling a motor speed, current, PWM duty cycle, or other suitable parameter), a position of one or more duct doors 362 (e.g., controlling an actuator position, current, or voltage), any other suitable device, or any combination thereof. In a further example, one or more duct doors 362 may be configured to direct or restrict air flow through evaporator 372 of refrigeration system 370 to cool air, dry the air, or both based on the control signal. Refrigeration system 370 may include a compressor (e.g., compressor 371 including an electric motor and compressor assembly), a condenser, evaporator (e.g., evaporator 372), and a throttle valve, along with any other suitable components, sensors, and plumbing. Refrigeration system 370 may be configured to operate using a refrigerant as a working fluid to achieve sub-ambient temperatures for cooling and/or drying air provided by blower 361. Heating system 380 may include one or more ohmic heaters or other suitable heating devices (e.g., heat recovery devices including heat exchangers) for transferring heat to air provided by cabin air system 360. For example, refrigeration system 370 and heating system 380 may be used to provide air at temperatures above or below ambient temperatures (e.g., and at suitable flow rates and heating/cooling rates to provide defogging, comfort, or both).

In an illustrative example, control system 320 may include cabin manager 326, which may include one or more ECUs used to control operation of cabin system 350. Cabin manager 326 may be associated with control circuitry of a particular ECU of control circuitry 321, distributed among ECUs of control circuitry 321 (e.g., connected by communications bus 327), a separate controller, any other suitable control circuitry, or any combination thereof. In some embodiments, cabin manager 326 may be configured to generate control signals, receive sensor signals, implement and update an algorithm (e.g., manage a state machine, state-flow system, logic instructions, or other suitable algorithm or combination thereof), update setpoints or targets, measure or determine vehicle operating information (e.g., measured or estimated temperatures, heat transfer, humidity psychometrics, or any other suitable information), receive information (e.g., from a remote system), retrieve reference information, determine a response, perform any other operation, or any combination thereof. In some embodiments, cabin manager 326, memory 325, or both, are configured to store information for managing view clearing and cabin comfort. In some embodiments, cabin manager 326 is configured to generate a display at user interface 340 to show the occupant available adjustments, system performance, current conditions (e.g., temperature, fogging metric), target conditions, reference values (e.g., predetermined limits, saturations, or thresholds), any other suitable information, or any combination thereof. In an illustrative example, suitable components of cabin system 350 may be configured to operate based on respective setpoints, and control circuitry 321, cabin manager 326, or a combination thereof is configured to modify the setpoints to manage view clearing and comfort.

In some embodiments, cabin system 350 is configured to provide occupant comfort, interior environment control, or otherwise affect cabin air conditions. In an illustrative example, a cabin air system 360, and control circuitry 321, cabin manager 326, or a combination thereof are configured to modify or cease modifying at least one cabin air setting such as air-conditioning setpoint (e.g., based on compressor speed), blower fan setpoint (e.g., a speed of a blower motor), heating temperature setpoint (e.g., as achieved by controlling current flow across a resistive element), total heating or cooling rate, duration of heating or cooling, or a combination thereof. In some embodiments, for example, control circuitry 321, cabin manager 326, or a combination thereof is configured to increase or decrease an AC setpoint for a desired comfort level, turn seat heating and cooling ON or OFF, enable automatic defogging or defrosting, adjust air flow rate, adjust air discharge temperature, or otherwise affect cabin conditions in vehicle interior 390.

FIGS. 4-10 are flowcharts illustrating processes 400-1000, which may be performed by system 300 (e.g., control system 320 thereof). For example, computer-readable instructions for implementing processes 400-1000 may be stored in memory 325 and may be implemented by control circuitry 321, cabin manager 326, or a combination thereof.

Figure 4:
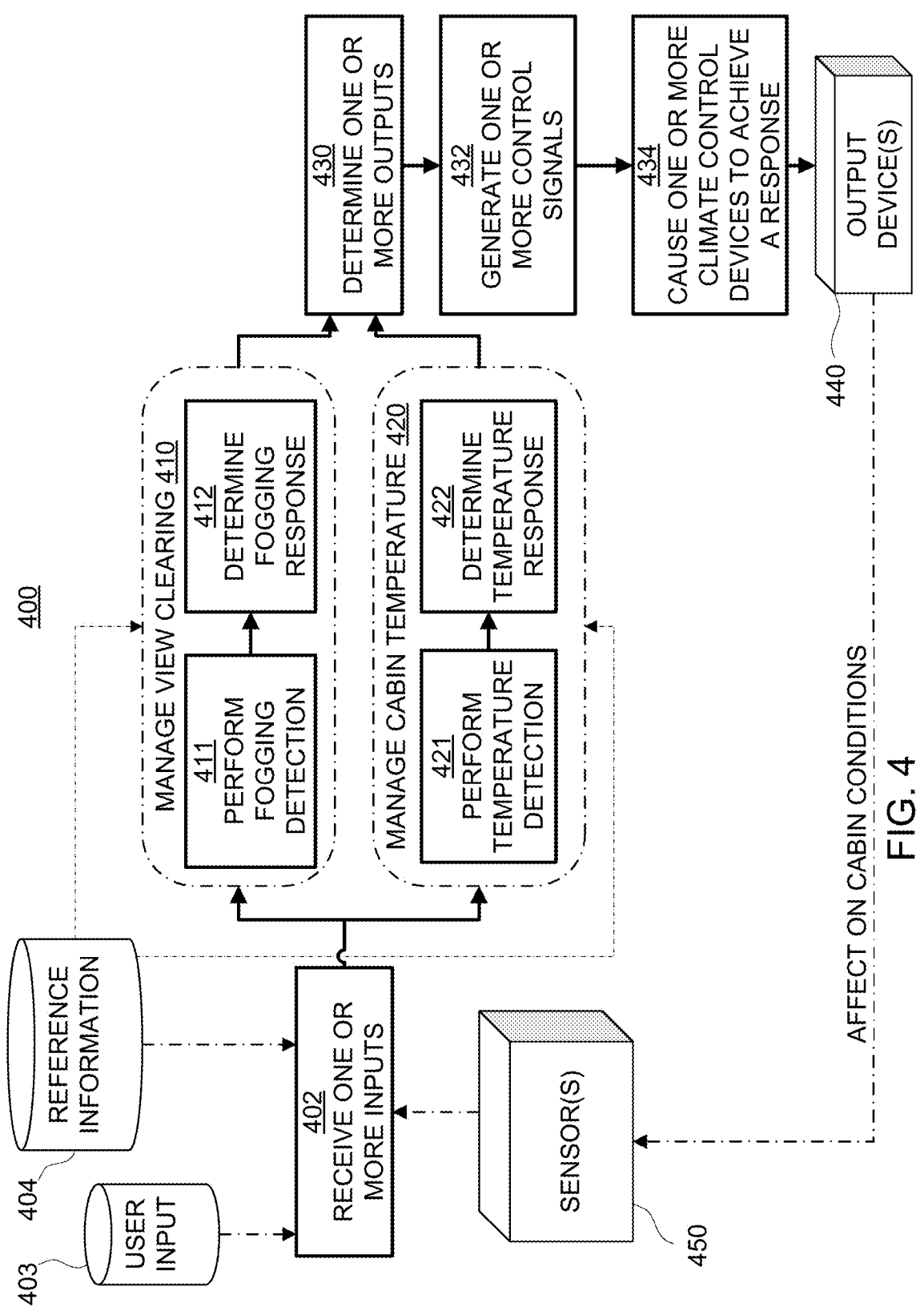
FIG. 4 is a flowchart of an illustrative process for managing cabin conditions, in accordance with some embodiments of the present disclosure.

FIG. 4 is a flowchart of illustrative process 400 for managing cabin conditions, in accordance with some embodiments of the present disclosure.

Step 402 includes the system receiving one or more inputs. In some embodiments, step 402 includes receiving the one or more inputs from sensors 450. For example, sensors 450 may include a plurality of sensors such as at least one temperature sensor, at least one relative humidity sensor, a solar flux sensor, a vehicle speed sensor, any other suitable sensor, or any combination thereof. In some embodiments, as illustrated, step 402 may include receiving user input 403 at a suitable interface (e.g., user interface 340 of FIG. 3). For example, user input 403 may include a selection of a knob, hard button, soft button, selectable icon or feature of a touchscreen, a menu item, any other suitable input or selection, or any combination thereof. In some embodiments, reference information 404 may be provided, retrieved from, or otherwise input to step 402. For example, reference information 404 may include preference information, maximum or minimum limits, thresholds, hierarchies, component information and capacities, predetermined setpoints, algorithm information, parameter values, any other suitable information, or any combination thereof.

Step 410 includes the system managing view clearing. In some embodiments, managing view clearing may include performing fogging detection at step 411 and determining a fogging response at step 412. To illustrate, the system may calculate a fogging metric at step 411 (e.g., based on available sensor signals and physics-based models) and then determine a response based on the fogging metric at step 412 (e.g., to achieve some target or goal).

Step 420 includes the system managing cabin temperature, such as a breath temperature for example. In some embodiments, managing the cabin temperature may include performing temperature detection at step 421 and determining a temperature response at step 422. To illustrate, the system may calculate a temperature metric at step 421 (e.g., based on available sensor signals and physics-based models) and then determine a response based on the temperature metric at step 422 (e.g., to achieve some target or goal).

Step 430 includes the system determining one or more outputs based on step 410, step 420, or a combination thereof. For example, at step 430 the system may determine a target blower duty cycle, target blower speed, target airflow, target discharge temperature, target evaporator temperature, target cooling rate, target compressor speed, target heater temperature, target heater heating rate, target duct door positions, any other suitable outputs, any changes in output thereof, or any combination thereof. In some embodiments, at step 430, the system may receive outputs from steps 410 and 420, and then determine an output based on received values. For example, the system may determine a maximum or most extreme output from among steps 410 and 420 and select that output.

Step 432 includes the system generating one or more control signals. For example, based on the outputs determined at step 430, the system may generate control signals for controlling a heater, a refrigeration system or components thereof, a cabin air system, a condenser/radiator/fan module, any other suitable climate control device, or any combination thereof.

Step 434 includes the system causing one or more climate control devices to achieve a response, by modifying an operational control. The control signals generated at step 432 cause the one or more climate control devices to achieve or partially achieve the target response. For example, control signals of step 432 may cause the one or more climate control devices to achieve a target blower speed, a target compressor speed, a target airflow rate, a target discharge temperature, a target heating rate, a target cooling rate, changes thereof, or any combination thereof.

Figure 5:
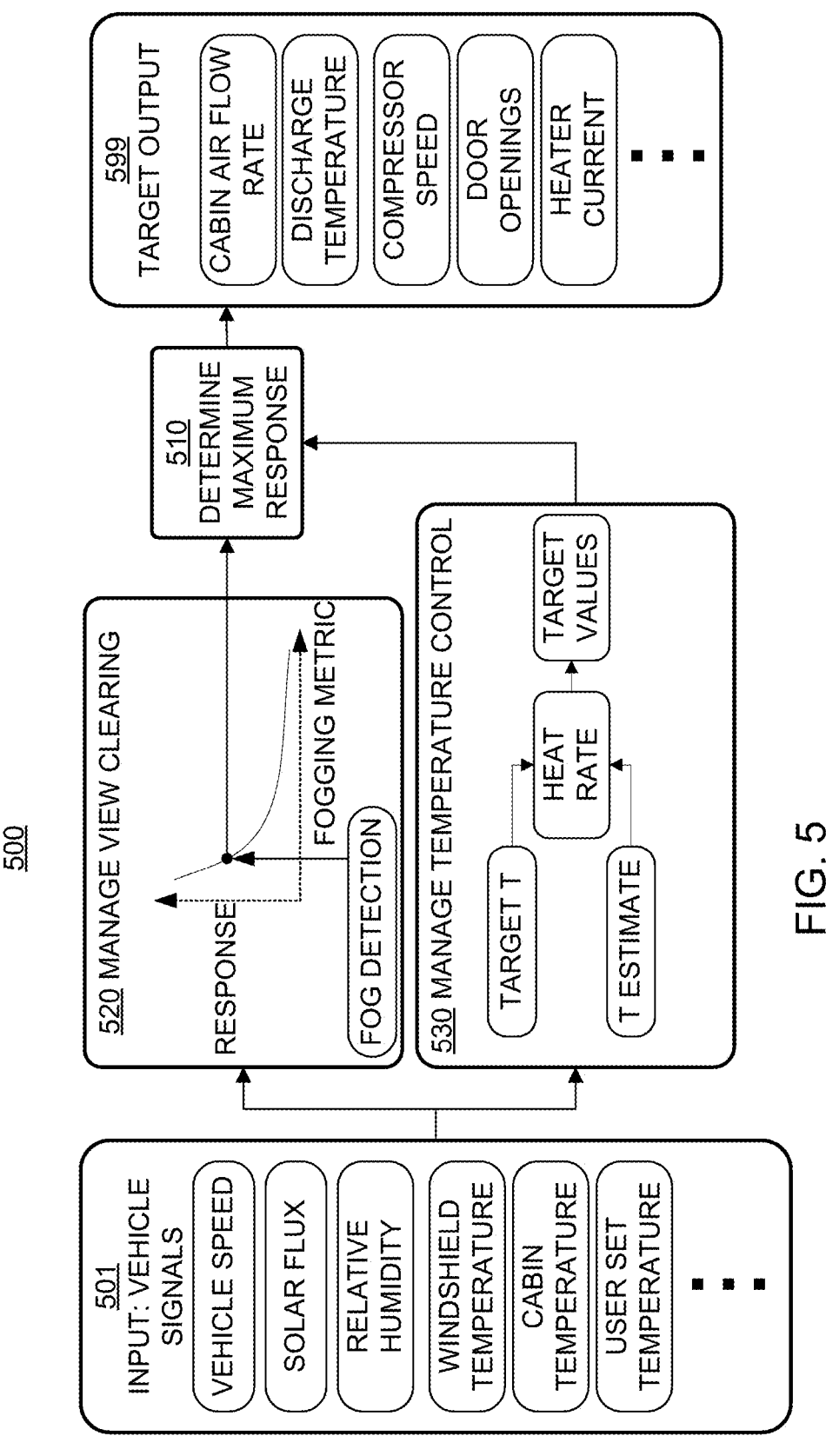
FIG. 5 is a flowchart of an illustrative process for determining a response to managing cabin conditions, in accordance with some embodiments of the present disclosure.

FIG. 5 is a flowchart of illustrative process 500 for determining a response to managing cabin conditions, in accordance with some embodiments of the present disclosure. For example, in some embodiments, process 500 is an example of process 400. For example, step 501, which may correspond to step 402, may include determining one or more inputs such as vehicle speed, solar flux, relative humidity, windshield temperature, cabin temperature, discharge temperature, evaporator temperature, user set temperature, any other suitable input (e.g., retrieved, measured or otherwise determined), or any combination thereof. Step 520 includes managing view clearing and may correspond to step 410, for example. To illustrate, step 520 may include determining a fog metric and then determining a response based on the fog metric. Step 530 includes managing temperature control (e.g., breath temperature control) and may correspond to step 420. To illustrate, step 530 may include comparing a determined target temperature and a temperature estimate, and then determining a response (e.g., a heating rate, a cooling rate, a blower setting, a compressor setting, a door setting) based on the comparison. Step 510 includes determining a maximum response from the output of steps 520 and 530. To illustrate, step 510 may correspond to step 430 of FIG. 4. For example, for each climate control device or a subset thereof, the system may determine a most extreme setpoint (e.g., a maximum or minimum) at step 510 and then generate a control signal based on the extreme setpoint. For example, step 599, which may correspond to step 432, step 434, or both, may include determining one or more outputs, generating one or more output signals (e.g., one or more control signals), or otherwise controlling one or more climate devices by modifying an operational control (e.g., several of which are listed). The one or more outputs may include, for example, cabin air flow rate (e.g., a blower speed), discharge temperature, compressor speed (e.g., of a refrigeration cycle), an evaporator temperature, one or more door positions (e.g., to direct cabin air), a heater current or power, any other suitable input (e.g., retrieved, measured or otherwise determined), or any combination thereof. In an illustrative example, FIGS. 6-7 may correspond to step 520, and FIGS. 8-9 may correspond to step 530.

Figure 6:
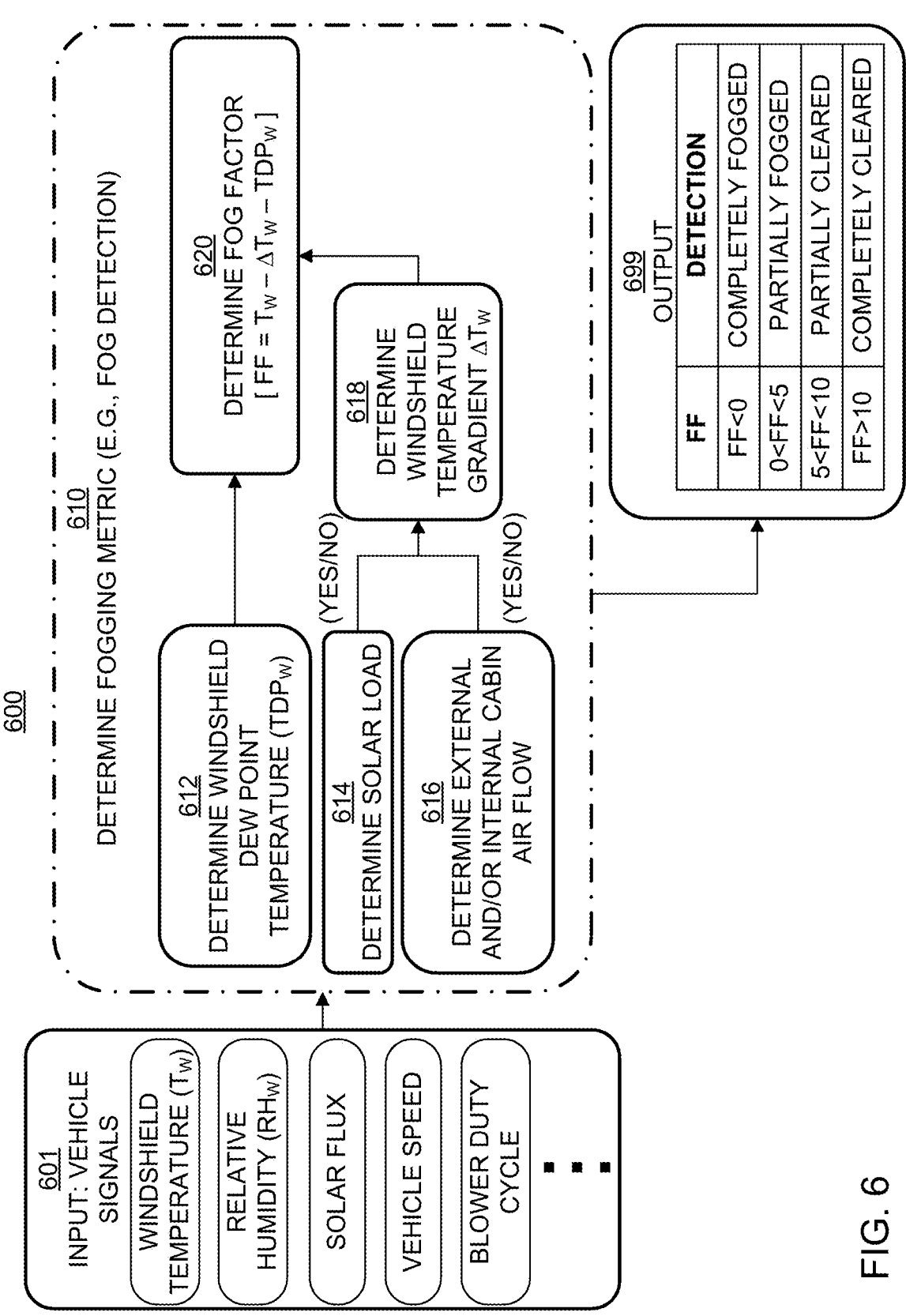
FIG. 6 is a flowchart of an illustrative process for detecting fogging conditions, in accordance with some embodiments of the present disclosure.

FIG. 6 is a flowchart of illustrative process 600 for detecting fogging conditions, in accordance with some embodiments of the present disclosure. To illustrate, process 600 may be the same as or otherwise include at least some of the same processes of step 410 of process 400 (e.g., step 411 thereof). Process 600 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 600 may be stored in memory 325.

Step 601 includes the system receiving input such as, for example, one or more sensor signals, any other suitable input, or any combination thereof. In some embodiments, at step 601, the system determines a value of an input based on received sensor signals, reference information (e.g., physical constants, parameters, scaling coefficient), models, logic operations, any other suitable criterion, or any combination thereof. As illustrated, the system may receive or otherwise determine a windshield temperature $T_w$, relative humidity $RH_w$ (e.g., corresponding to the windshield, such as windshield relative humidity), solar flux (e.g., irradiation in a suitable spectral range as measured by an absorption sensor, vehicle speed (e.g., based on a motor speed or shaft speed), blower duty cycle $D_B$, any other suitable input, or any combination thereof.

Step 610 includes the system determining a fogging metric or otherwise determining an indication of fogging (e.g., fog detection). As illustrated, step 610 may be a process that includes any or all of steps 612, 614, 616, 618, and 620.

Step 612 includes the system determining a windshield dew point temperature TDPw (e.g., based on windshield relative humidity $RH_w$). For example, for a particular value of relative humidity, and optionally based on a barometric pressure or other state information, the system may determine a temperature at which water vapor in the air will begin to condense from the vapor phase to the liquid phase (e.g., the dew point temperature).

Step 614 includes the system determining whether solar load is present, or otherwise determine an indication of solar load. In some embodiments, the system determines a binary classification (e.g., "yes" or "no" regarding whether there is solar loading). In some embodiments, the system determines a value, qualitative indication, or quantitative indication of solar load. For example, in some embodiments, the system may estimate an amount of solar flux, an amount of heat absorbed from solar flux, a temperature difference arising from solar flux, any other suitable value, or any combination thereof. To illustrate, for negligible or otherwise lesser values of solar flux, the system may determine the solar load is negligible or otherwise there is no solar load. For greater values of solar flux, the system may determine a solar load value or otherwise determine there is solar loading.

Step 616 includes the system determining an indication of external cabin airflow, internal cabin airflow, or a combination thereof. In some embodiments, the system determines a binary classification (e.g., "yes" or "no" regarding whether there is airflow). In some embodiments, the system determines a value, qualitative indication, or quantitative indication of airflow or convection at the exterior (e.g., based on vehicle speed, ambient conditions) and/or interior of the cabin (e.g., based on blower speed or duty cycle). For example, in some embodiments, the system may estimate an amount of airflow (e.g., a rate), an air velocity, an air convective coefficient, a temperature difference arising from convection, any other suitable value, or any combination thereof. To illustrate, for negligible or otherwise lesser values of airflow (e.g., zero vehicle speed, zero blower duty cycle), the system may determine the cabin flow is negligible or otherwise there is no cabin flow. For greater values of vehicle speed and/or blower duty cycle, the system may determine a cabin airflow value or otherwise determine there is cabin airflow.

Step 618 includes the system determining a windshield temperature gradient $\Delta T_w$. In some embodiments, the system may determine (e.g., estimate) a difference in windshield temperature at two or more different locations on the windshield to calculate the windshield temperature gradient. In some embodiments, the system may determine based on steps 614 and 616 a windshield temperature gradient. For example, for greater solar loading and greater cabin airflow, the system may estimate a larger value of the windshield temperature gradient. In some embodiments, the system may apply a heat transfer model to the windshield domain (e.g., solid state conductivity), with convective and radiative boundary conditions to estimate the windshield temperature gradient. The system may determine the windshield temperature gradient in units of temperature (e.g., temperature difference), temperature per unit length (K/m), non-dimensional units (e.g., normalized), any other suitable units indicative of a temperature gradient, or any combination thereof. To illustrate, the system may determine a 0-D (e.g., a single value or a point), 1-D (e.g., a vector or a line), 2-D (e.g., a 2-D array or a plane), or 3-D (e.g., a 3-D array or a volume) indication of the gradient. To illustrate, because the windshield temperature may be measured at one location (e.g., a sensor location), the temperature gradient accounts for changes from that measured temperature spatially across the windshield.

Step 620 includes the system determining the fogging metric such as a fog factor FF. As illustrated, the system uses $FF=T_w-\Delta T_w-TDP_w$ to determine the fog factor. The system determines the fogging metric based on a function (e.g., parameterized, piecewise), a set of logic operations, a data-based or lookup table, any other suitable mapping or relationship, or any combination thereof. In an illustrative example, the system may implement step 610 (e.g., step 620 thereof) to create a virtual sensor for measuring fogging or expectation for fogging. In some circumstances, condensation is not directly measured by a sensor and the system uses available sensor signals, conditions, and physical models to estimate fogging in real time. The fog factor of step 620 may provide an indication of fogging or otherwise may be used to determine how clear the windshield or windows are for viewing by the occupant.

Step 699 includes the system outputting the fogging metric of step 610. For example, as illustrated, for increased values of FF, the less likely fog is to be present. For lesser values of FF, the more likely fog is to be present. For example, for FF values less than zero, complete fogging is expected. For FF values in a first range (e.g., 0-5), partial fogging is expected (e.g., patchy fog covering most but not all of the windshield). For FF values in a second range (e.g., 5-10), partially clearing is expected (e.g., patchy fog covering only a portion of the windshield). For FF values in a third range (e.g., greater than 10), complete clearing is expected (e.g., no water condensed on the windshield). While illustrated for a nominal range of 0-10, a fogging metric may be scaled in any suitable manner (e.g., 0 to 1, −1 to 1, 0 to 100), classified as belonging to a range (e.g., without a numerical value), or may be unscaled (e.g., and compared with a suitable reference or guide).

Figure 7:
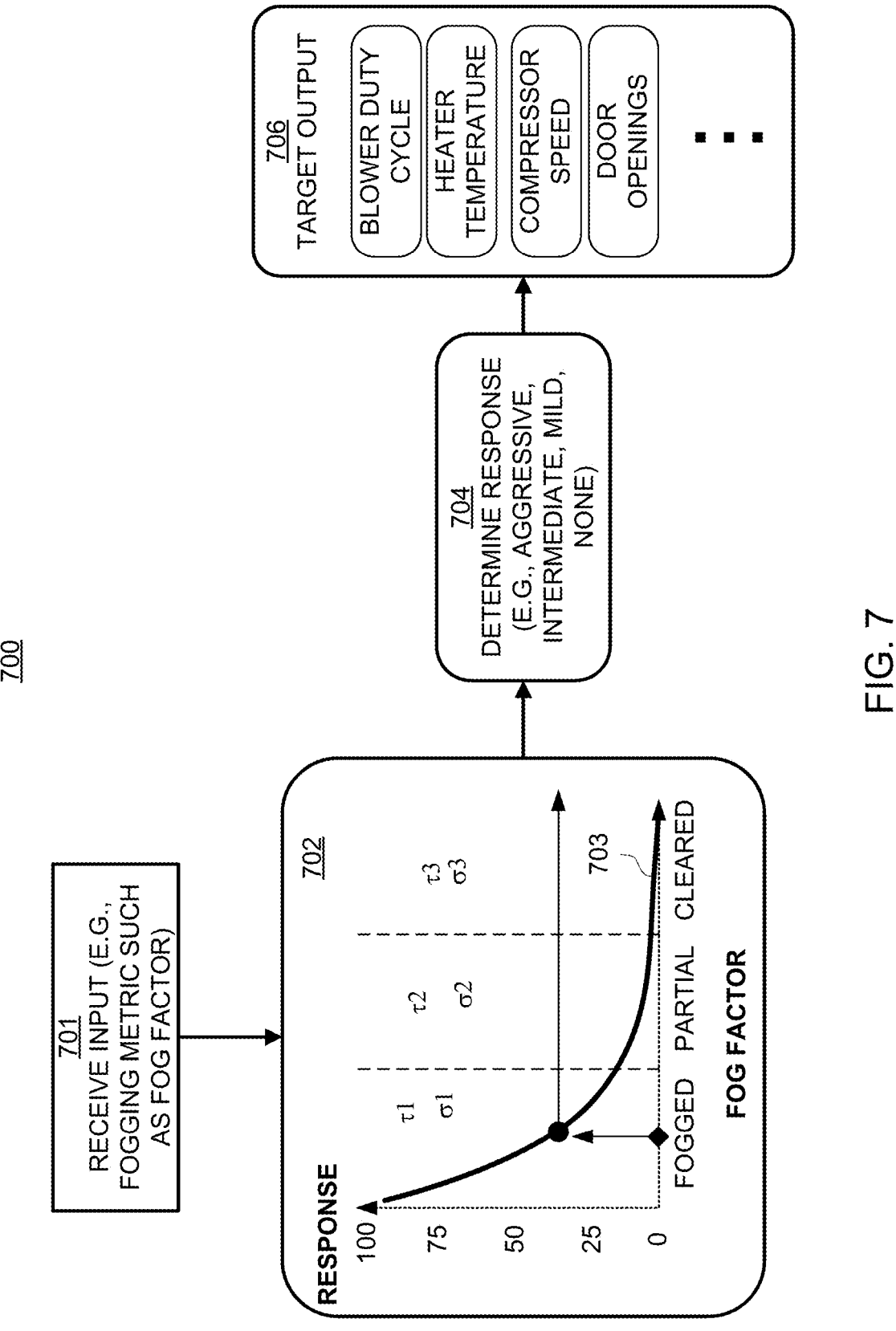
FIG. 7 is a flowchart of an illustrative process for responding to fogging conditions, in accordance with some embodiments of the present disclosure.

FIG. 7 is a flowchart of illustrative process 700 for responding to fogging conditions, in accordance with some embodiments of the present disclosure. To illustrate, process 700 may the same as or otherwise include at least some of the same processes of step 410 of process 400 (e.g., step 412 thereof). To illustrate further, process 700 may be applied to the output of process 600 to determine a response to the fogging metric determined during process 600. Process 700 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 700 may be stored in memory 325.

Step 701 includes the system receiving input such as, for example, a determined fogging metric such as fog factor, one or more sensor signals, any other suitable input, or any combination thereof. In some embodiments, at step 701, the system determines a value of an input based on received sensor signals, reference information (e.g., physical constants, parameters, scaling coefficient), models, logic operations, any other suitable criterion, or any combination thereof. In some embodiments, for example, process 600 may be combined with process 700, and step 701 need not be a separate step (e.g., the output of process 600 may be provided to step 702).

Step 702 includes the system mapping a response to the input received at step 701. As illustrated, a fogging metric such as a fog factor may be received at step 701, and the system may map a response metric using relationship 703 (e.g., which may be a function). As illustrated, relationship 703 is an exponential function, which may be continuous, piecewise continuous, or other suitable exponential functions. For example, in some embodiments, relationship 703 may be characterized as one or more of the following:

$$Response = Ae^{-FF/\sigma} \qquad \text{Relationship 1}$$

$$Response = \begin{cases} Ae^{-FF/\sigma 1} \text{ for } FF0:FF1 \\ Ae^{-FF/\sigma 2} \text{ for } FF1:FF2 \\ Ae^{-FF/\sigma 3} \text{ for } FF2:FF3 \end{cases} \qquad \text{Relationship 2}$$

$$\{Response, \tau\} = f(FF, \sigma_i, A) \qquad \text{Relationship 3}$$

where "A" is a coefficient of order one "O(1)," "FF" is fog factor or other suitable fogging metric, and "σ" is a scaling factor. In some embodiments, σ may be dependent on FF (e.g., factors σ1, σ2, and σ3, which may be the same or different, in ranges defined by fog factor values FF0, FF1, FF2, and FF3). In some embodiments, a time scale for response is also determined based on FF (e.g., time constants τ1, τ2, and τ3) to affect how quickly the system responds to the fogging metric. It will be understood that although three ranges are shown for FF in FIG. 7, any suitable discretization may be used in accordance with the present disclosure (e.g., one range, two ranges, more than three ranges). The system may implement any or all of relationships 1-3 above, any other suitable relationship, or any combination thereof. In some embodiments, the system may map a value of a fogging metric (e.g., indicated by the ◆ symbol) to a response value based on relationship 703 (e.g., indicated by the ● symbol).

Step 704 includes the system determining a response based on the mapping of step 702. In some embodiments, a fogging metric in the "FOGGED" range corresponds to an aggressive response (e.g., greater response), a fogging metric in the "PARTIAL" range corresponds to an intermediate response (e.g., a relatively lesser response), and a fogging metric in the "CLEARED" range corresponds to a mild response or otherwise no response. Based on the response (e.g., aggressive, intermediate, mild, or none), the system may determine a setpoint, a change to a setpoint, a target value, a rate, any other suitable response, or any combination thereof. In some embodiments, steps 702 and 704 may be combined, wherein the response is mapped to the fogging metric without classifying the fogging metric or response. For example, a response such as blower duty cycle, heater temperature, compressor speed, or duct door positions may be mapped directly to FF without necessarily classifying as aggressive or mild.

Step 706 includes the system determining a target output, based on the determined response at step 704. In some embodiments, step 706 includes generating a control signal based on the target output. In some embodiments, step 706 includes causing at least one climate control device to affect a change to the cabin conditions to reduce fogging, increase comfort, prevent an increase in fogging, prevent an increase in discomfort, or a combination thereof. For example, the blower duty cycle may be increased (e.g., more aggressive response) to increase blower motor speed and thus air flow and thus convection in the vehicle interior. In a further example, a temperature of a heater may be increased (e.g., more aggressive response), by increasing current flow, to raise the air discharge temperature and thus lower relative humidity and the propensity for fogging. In a further example, a compressor speed may be increased (e.g., more aggressive response), by increasing compressor motor currents, to increase a pressure differential and/or mass flow rate of refrigerant, thus resulting in increased heat transfer and/or lower AC temperatures. In a further example, one or more duct doors may be opened or closed to direct airflow, increase or decrease air flow rate, affect air discharge temperature, or a combination thereof. To illustrate, door openings may be adjusted to direct more airflow to the windshield to improve defogging or defrosting (e.g., more aggressive response for view clearing), or direct more airflow to the cabin towards the occupant to affect comfort (e.g., breath temperature).

Figure 8:
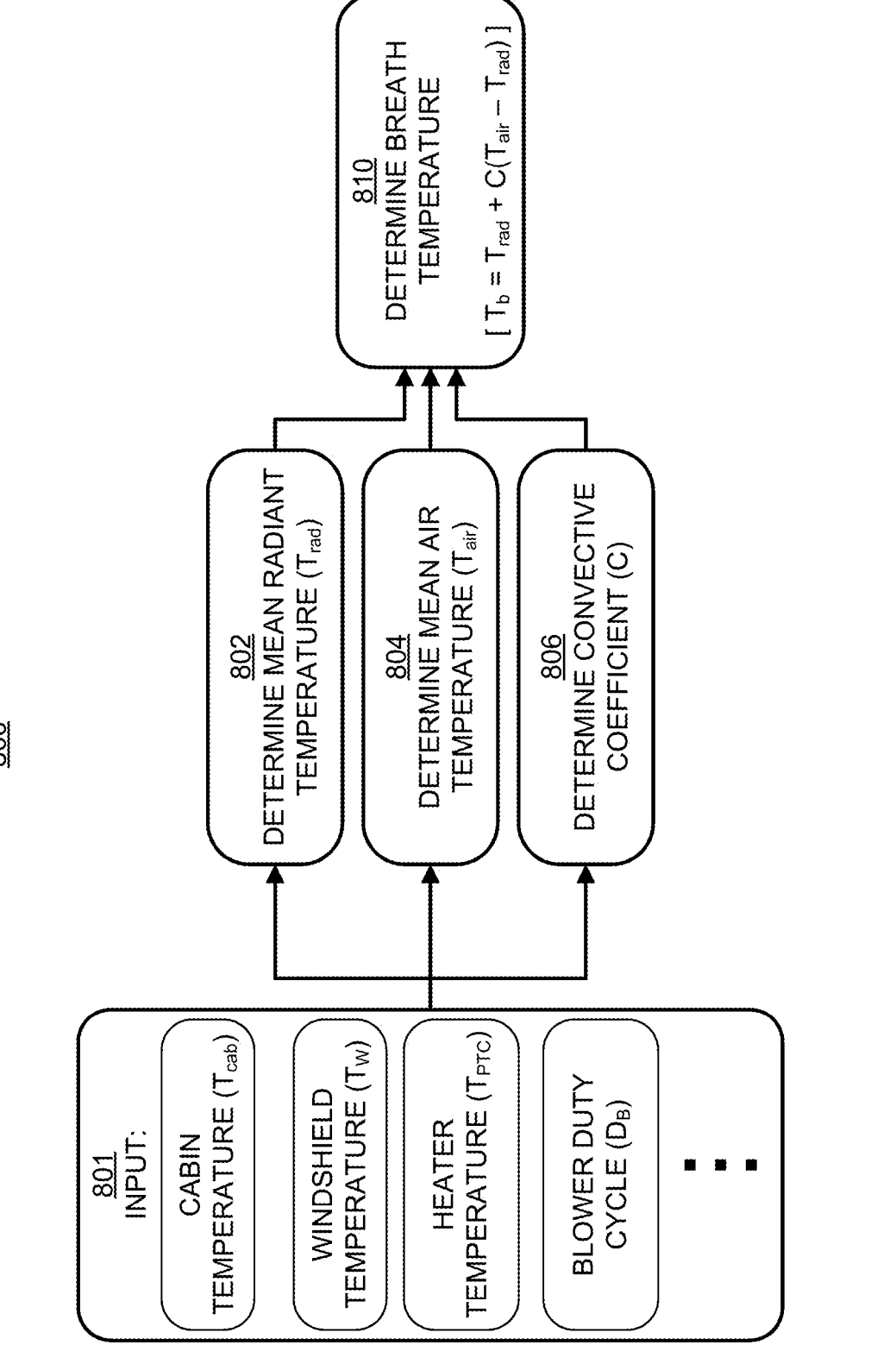
FIG. 8 is a flowchart of an illustrative process for detecting breath temperature, in accordance with some embodiments of the present disclosure.

FIG. 8 is a flowchart of illustrative process 800 for detecting breath temperature, in accordance with some embodiments of the present disclosure. To illustrate, process 800 may the same as or otherwise include at least some of the same processes of step 420 of process 400 (e.g., step 421 thereof). Process 800 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 800 may be stored in memory 325.

Step 801 includes the system receiving or otherwise determining inputs. For example, the system may receive input such as, for example, one or more sensor signals, any other suitable input, or any combination thereof. In some embodiments, at step 701, the system determines a value of an input based on received sensor signals, reference information (e.g., physical constants, parameters, scaling coefficient), models, logic operations, any other suitable criterion, or any combination thereof. As illustrated, the system may receive or otherwise determine a cabin temperature $T_{cab}$, windshield temperature $T_w$, heater temperature $T_{PTC}$, blower duty cycle DB, any other suitable input, or any combination thereof.

Step 802 includes the system determining a mean radiant temperature $T_{rad}$. In some embodiments, the mean radiant temperature is a function of cabin temperature $T_{cab}$ and windshield temperature $T_w$, such as $T_{rad}=f_1(T_{cab}, T_w)$, for example. In some embodiments, $T_{rad}$ need not be determined based on a function and may be determined based on any suitable inputs or combination of inputs, using any suitable mapping (e.g., a function, a database, set of logic operations, a model, or a combination thereof).

Step 804 includes the system determining a mean air temperature $T_{air}$. In some embodiments, the mean air temperature is a function of cabin temperature $T_{cab}$, windshield temperature $T_w$, and heater temperature $T_{PTC}$, such as $T_{air}=f_2(T_{cab}, T_w, T_{PTC})$, for example. In some embodiments, $T_{air}$ need not be determined based on a function and may be determined based on any suitable inputs or combination of inputs, using any suitable mapping (e.g., a function, a database, set of logic operations, a model, or a combination thereof).

Step 806 includes the system determining a convective coefficient C (e.g., corresponding to the vehicle interior or a portion thereof). In some embodiments, the convective coefficient is a function of blower duty cycle $D_B$, such as $C=f_3(D_B)$, for example. In some embodiments, C need not be determined based on a function and may be determined based on any suitable inputs or combination of inputs, using any suitable mapping (e.g., a function, a database, set of logic operations, a model, or a combination thereof). In an illustrative example, the system may determine the convective coefficient using $C=aB^c$, wherein "a" is a coefficient, B is blower speed (e.g., as determined based on a sensor such as an encoder or based on blower duty cycle), and "c" is an exponent.

Step 810 includes the system determining (e.g., estimating) a breath temperature $T_b$. For example, in some embodiments, the breath temperature is determined based on the output of steps 802, 804, and 806, as illustrated. In a further example, the breath temperature may be a function of mean radiant temperature $T_{rad}$, mean air temperature $T_{air}$, and convective coefficient C, such as $T_b=f_4(T_{rad}, T_{air}, C)$, for example. In an illustrative example, the system may determine the breath temperature using $T_b=T_{rad}+C(T_{air}-T_{rad})$, wherein C is of order one O(1).

In an illustrative example, the system may implement process 800 to create a virtual sensor for measuring breath temperature. In some circumstances, breath temperature is not directly measured (e.g., no sensor located on or very near an occupant) and the system uses available sensor signals, conditions, and physical models to estimate breath temperature in real time. In some embodiments, the system may determine a single scalar temperature value. In some embodiments, the system may determine a scalar temperature field (e.g., at predetermined locations or domains), a gradient (e.g., a single value or a field), a temporal change (e.g., a time derivative or difference), any other suitable value or set of values, or any combination thereof. The output of process of 800 may include a breath temperature estimate, which provides an indication of comfort or otherwise may be used to determine an indication of comfort for the occupant.

Figure 9:
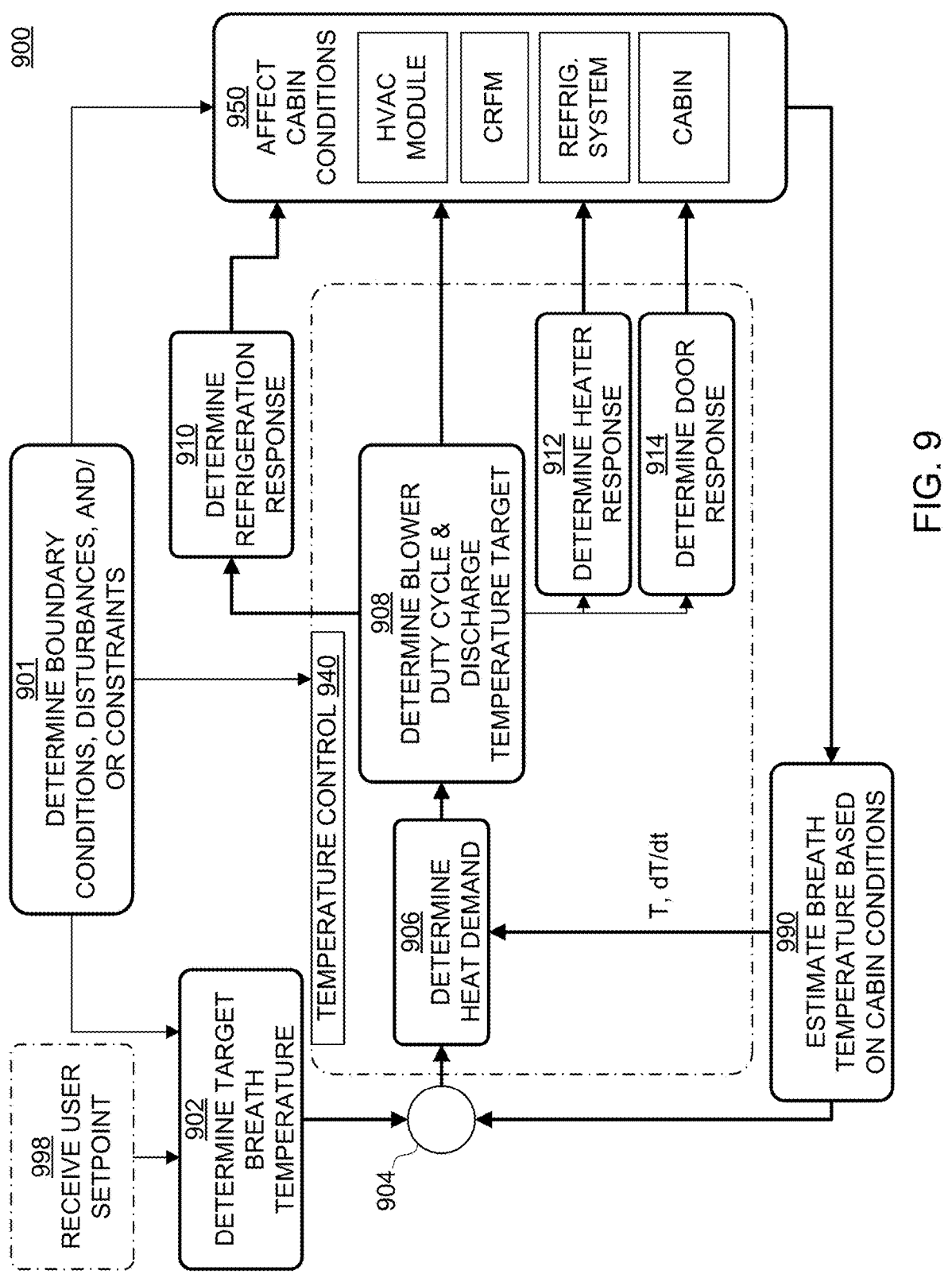
FIG. 9 is a flowchart of an illustrative process for responding to breath temperature, in accordance with some embodiments of the present disclosure.

FIG. 9 is a flowchart of illustrative process 900 for responding to breath temperature, in accordance with some embodiments of the present disclosure. To illustrate, process 900 may be the same as or otherwise include at least some of the same processes of step 420 of process 400 (e.g., step 422 thereof). To illustrate further, process 900 may be applied to the output of process 800 to determine a response to the temperature metric determined during process 800. Process 900 may be performed by control system 320 of FIG. 3 (e.g., control circuitry 321, cabin manager 326, or both), cabin controller 104 of FIG. 1, any other suitable system, or any combination thereof. For example, computer readable instructions for implementing process 900 may be stored in memory 325.

Step 902 includes the system determining a target breath temperature. In some embodiments, the system may receive a user setpoint or a setpoint provided by cabin manager 326 (e.g., based on reference information or user preferences) at step 998. For example, the user may adjust a setpoint using user interface 340 of FIG. 3, which may include a button, a turnable knob, a sliding switch or selector, any other suitable selectable options, or any combination thereof. The selectable option may correspond to a desired temperature, a desired heating or cooling rate, any other suitable cabin setting, a change thereof, or any combination thereof.

Step 990 includes the system estimating or otherwise determining a breath temperature based on cabin conditions. For example, step 990 may include the system implementing process 800 of FIG. 8 to determine breath temperature based on one or more sensor signals, a model, any other suitable information, or any combination thereof.

Step 904 includes the system determining a difference between the target breath temperature of step 902 and the determined breath temperature based on cabin conditions at step 990. The difference (e.g., ΔT) is indicative of the difference between the current conditions and target conditions of the cabin, and accordingly the system may determine a relatively greater response based on a relatively greater difference.

Step 906 includes the system determining a heat demand or otherwise indication of target heating or cooling. In some embodiments, the system may determine a total heat that must be removed or provided and also a heat rate to govern the rate at which heat is removed or added.

For example, the heat removal may be estimated as Q=mCΔT, or in rate form as dQ/dt=d(mCT)/dt or in some circumstances dQ/dt=massflow$_{air}$*C*ΔT. In some embodiments, the heat transfer rate may be limited based on system performance limitations, limitations to changes to user comfort, predetermined saturation limits, any other suitable criterion, or any combination thereof. The system may determine the heating or cooling demand based on a function, lookup table, database, logical operations, any other suitable relationship, any other suitable information, or any combination thereof.

Step 908 includes the system determining a target blower duty cycle, target discharge temperature, any other suitable target value, or any combination thereof. For example, based on the heat/cool demand of step 906, the system may determine a massflowair, target discharge air temperature, or any other suitable parameter, and then determine a blower duty cycle based on the parameter(s). In some embodiments, the system may use a reference (e.g., stored in memory 325) relationship between heat/cool demand, blower duty cycle, and target discharge temperature.

Step 910 includes the system determining a refrigeration response or otherwise generate one or more control signals for controlling the refrigeration system (e.g., to control a compressor speed or other aspect of the system). For example, in some embodiments, at step 910, the system determines a target compressor speed and generates a corresponding control signal (e.g., a voltage, current, PWM duty cycle, or any other suitable signal). In some embodiments, at step 910, the system may determine a target evaporator temperature, refrigerant flow rate, or other parameter, and then determine a corresponding compressor speed. Referencing FIG. 3, control system 320 may transmit a control signal to compressor 371 of refrigeration system 370, to control the speed of compressor 371 (e.g., by controlling a speed of a compressor motor).

Step 912 includes the system determining a heater response based on the target discharge temperature of step 908. For example, in some embodiments, the system determines a target discharge temperature at step 908, and then determines a current flow at step 912 that corresponds to the target discharge temperature. In some embodiments, at step 912, the system determines a heating rate (e.g., the product of current and voltage), a commanded current, a saturation or limit to heating rate, a change in heating rate, a duty cycle (e.g., a PWM duty cycle), any other suitable parameter, or change thereof, or any combination thereof to affect operation of a heater (e.g., a positive temperature coefficient heater (PTC) that may include ceramic). To illustrate, the greater the target discharge temperature (e.g., as compared to a reference or measured temperature), the greater the heater response. Referencing FIG. 3, control system 320 may transmit a control signal to heating system 380 to control heating rate, temperature, or both of a heater of heating system 380.

Step 914 includes the system determining a response for one or more doors of a ducting system of the cabin system. For example, at step 914, the system may determine a respective position or change in position for each door of a set of one or more doors, and then generate a respective control signal to control a respective actuator coupled to each respective door. Referencing FIG. 3, control system 320 may transmit a control signal to duct door(s) 362 of cabin air system 360 to control a position of duct door(s) 362.

Step 950 includes the system affecting cabin conditions by controlling an HVAC module, condenser/radiator/fan module (CRFM), refrigeration system, any other suitable system or climate control device thereof, or any combination thereof. For example, the temperature, convective environment (e.g., airflow rate and distribution), or a combination thereof of the cabin may be affected by steps 910, 912, and 914. Based on the cabin air conditions or changes thereof in the cabin, the system may estimate breath temperature at step 990 as part of the feedback control loop to control cabin conditions based on user input (e.g., at step 998).

Step 901 includes the system determining one or more boundary conditions, disturbances, constraints, or a combination thereof. For example, the system may determine a convective boundary condition (e.g., based on vehicle speed), a radiation boundary condition (e.g., based on a solar flux sensor), a surface temperature, an environmental condition (e.g., ambient humidity, temperature, pressure, wind, precipitation, visibility), a vehicle setting (e.g., current draw or limits thereof, performance limits, hierarchy of current flow in view of a current limit), predetermined user setpoints, any other suitable information, any changes thereof, or any combination thereof.

As illustrated, processes 600, 700, 800, and 900 of FIGS. 6-9 may be implemented by process 400 or 500 of FIGS. 4-5. For example, processes 400 and 500 may include fog detection (e.g., process 600), determine a response to fogging (e.g., process 700), temperature detection (e.g., process 800), or determining a response to the temperature detection (e.g., process 900).

In an illustrative example, process 600 may include determining a fogging metric for a vehicle interior and process 800 may include determining a breath temperature metric. Steps 430, 432, 510, 599, 704, 706, 908, 910, 912, 914, 950, or a combination thereof may include determining a response based on the fogging metric and the breath temperature metric. For example, processes 700 and 900 may include determining respective responses for view clearing and cabin comfort. Steps 432, 434, 599, 706, and 950 may include controlling at least one climate control device based on the response.

In a further illustrative example, determining a fogging metric (e.g., at step 411, 520, and/or step 620) may include determining a relative humidity corresponding to a windshield of the vehicle, determining a temperature corresponding to the windshield, determining a solar flux corresponding to the windshield, determining a blower duty cycle, determining any other suitable metric indicative of fogging or visibility, or any combination thereof.

In a further illustrative example, determining the fogging metric determining the fogging metric (e.g., at step 411, 520, and/or step 620) may include determining, or otherwise be based on, a dewpoint temperature corresponding to a windshield, a temperature corresponding to the windshield, and a temperature gradient corresponding to the windshield. For example, the temperature gradient may be estimated or otherwise determined based on a solar flux and a cabin air flow rate.

In a further illustrative example, determining a response based on the fogging metric and the breath temperature metric comprises classifying the fogging metric based on a predetermined classification scheme. For example, the system at step 412, 520, 704 and/or step 706, the system may access reference information (e.g., reference information 404), which may include a lookup table, database, state flow instructions, logic instructions, or other suitable information for instructions for determining the response based on the fogging metric. In a further example, the system may classify a range to which the fogging metric belongs (e.g., as falling between successive thresholds which define the range), and then determine the response based on the range. To illustrate, the classification scheme may allow for some discretization of the response based on discreet ranges or classes, rather than a continuous range of response. In some embodiments, the system need not use a classification scheme and may determine the response based on the fogging metric without classifying the fogging metric. In some embodiments, the system determines the response (e.g., based on the fogging metric and the breath temperature metric) by determining a response metric based on a functional relationship with the fogging metric. For example, the system may implement process 702, wherein an exponential functional relationship is applied. In a further example, the response may include a blower duty cycle, a heater temperature, a compressor speed, an air system duct door position, any other suitable response, or combinations thereof.

In a further illustrative example, the system may determine a breath temperature metric at steps 421, 530, 810, or a combination thereof. The system may determine the breath temperature metric by determining a radiant temperature, determining an air temperature for the vehicle interior, determining a convection metric for the vehicle interior, determining any other suitable parameter or operating characteristic, or any combination thereof. In a further example, the system may determine the breath temperature metric by determining a difference between a target breath temperature and an estimated breath temperature, and then determine the response (e.g., based on the fogging metric and the breath temperature metric). In some embodiments, the system determines a heat demand metric (e.g., a target heat/cool amount, heating/cooling rate), determines a heating rate or cooling rate, and determines at least one of a blower duty cycle or a target air discharge temperature, or combinations thereof.

In a further illustrative example, the system may control the at least one climate control device (e.g., at any or all of steps 432, 434, 599, 706, or 950) by controlling at least one of a blower, a resistance heater, a compressor, or an actuated duct door, or combinations thereof (e.g., one or more of output devices 440).

In a further illustrative example, determining the response based on the fogging metric and the breath temperature metric is based on a first climate control device of the at least one climate control device. For example, at any of steps 430, 432, 510, or 599 may include the system determining a first response based on the fogging metric (e.g., at step 704 or 706), determining a second response based on the breath temperature metric (e.g., at step 908, 910, 912, 914, or 950), and then comparing the first response to the second response.

In a further illustrative example, the system may receive a plurality of sensor signals from a plurality of sensors at any or all of steps 402, 501, 601, or 801. To illustrate, the plurality of sensors may include, for example, at least one temperature sensor, at least one relative humidity sensor, a solar flux sensor, a vehicle speed sensor, any other suitable sensor, or any combination thereof.

In some circumstances, the system may operate in varying environmental climates and conditions, under varying operating conditions, and with varying user expectations or requirements. For example, in cold environments, the propensity to fog may be increased when the vehicle is starting and the system may determine the response to favor view clearing. In some embodiments, the system may detect fogging additionally at a side window or rear window, by applying process 600. In some embodiments, the system may receive information about vehicle operating conditions or other vehicle information such as power consumption, power limits (e.g., current limits), component limits (e.g., maximum currents, speeds, or temperatures), user preferences, or a combination thereof to determine the response.

In some embodiments, the system determines a response for either or both of view clearing and breath temperature. In some embodiments, the system need not determine a response for both view clearing and breath temperature. For example, in some circumstances, the system may determine that the response for view clearing prevails and selects that response (e.g., during vehicle startup in cold weather). In a further example, if the ambient temperature is relatively large and/or the ambient humidity is relatively low, the system need not determine a fogging response.

Figure 10:
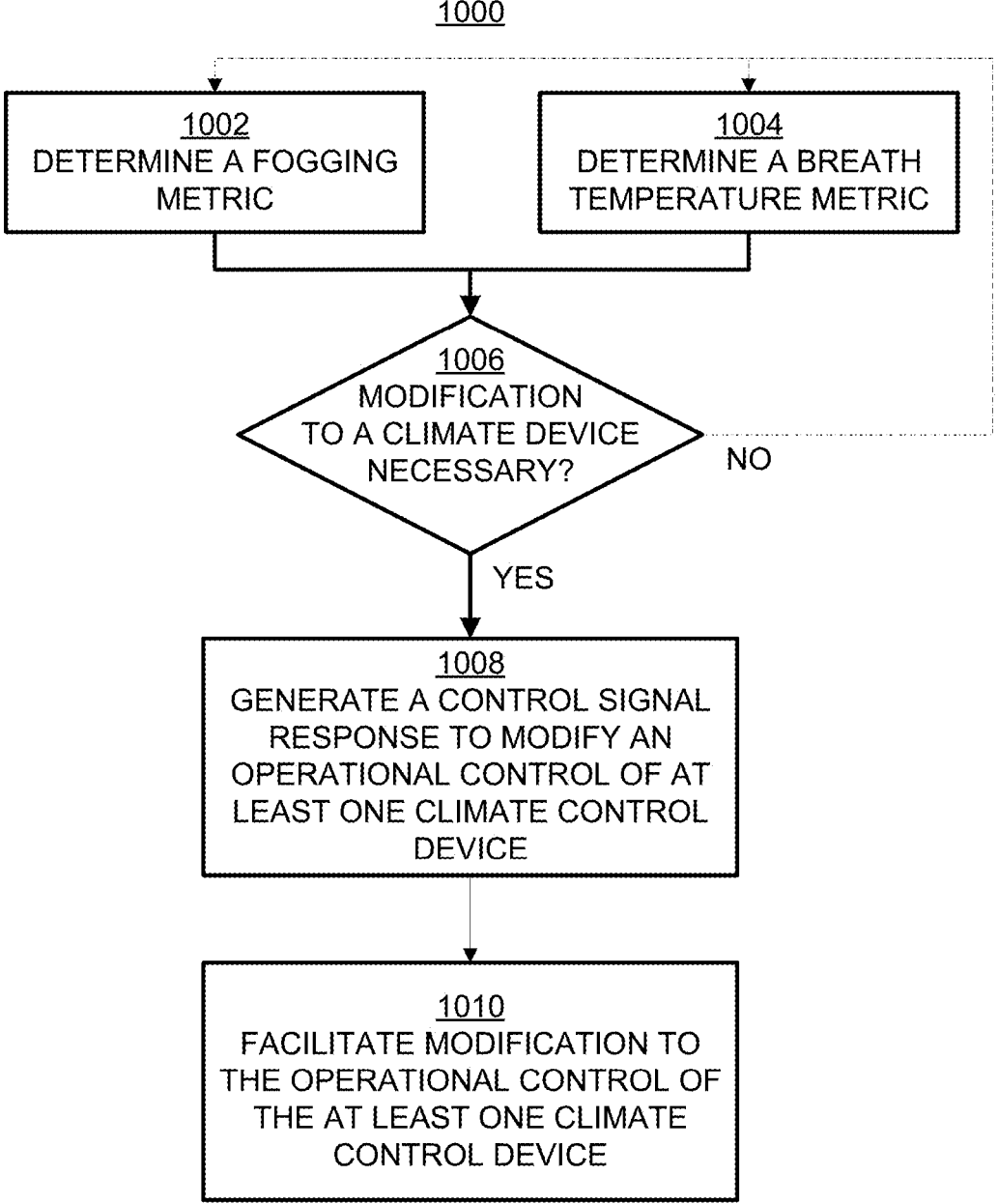
FIG. 10 is a flowchart of an illustrative process for modifying an operational control of at least one climate control device, in accordance with some embodiments of the present disclosure.

FIG. 10 is a flowchart of illustrative process 1000 for modifying an operational control of at least one climate control device, in accordance with some embodiments of the present disclosure. To illustrate, process 1000 may be performed by control system 320, in order to control cabin system 350 to achieve conditions in vehicle interior 390.

Step 1002 includes the system determining a fogging metric (e.g., for an interior of a vehicle such as a cabin). For example, step 1002 may include aspects of any or all of step 410, step 520, process 600, or process 700. In some embodiments, step 1002 includes determining the fogging metric based on one or more inputs such as, for example, a sensor signal (e.g., as illustrated by step 401 or step 501 of FIGS. 4-5). In some embodiments, step 1002 includes determining a relative humidity corresponding to a windshield of the vehicle, determining a temperature corresponding to the windshield, determining a solar flux corresponding to the windshield, determining a blower duty cycle, or combinations thereof. In some embodiments, step 1002 includes determining the fogging metric based on a dewpoint temperature corresponding to a windshield, a temperature corresponding to the windshield, and a temperature gradient corresponding to the windshield. The temperature gradient may be determined based on a solar flux and a cabin air flow rate, as illustrated by process 600 of FIG. 6.

Step 1004 includes the system determining a breath temperature metric (e.g., for the cabin or otherwise the interior of a vehicle). The breath temperature metric may be determined based on a passenger of the vehicle (e.g., a particular zone of the vehicle such as front seats, rear left seat), wherein an input is received as a user interface to specify a temperature or other condition or change thereof. For example, step 1004 may include aspects of any or all of step 420, step 530, process 800, or process 900. In some embodiments, step 1004 includes determining the fogging metric based on one or more inputs such as, for example, a sensor signal (e.g., as illustrated by step 401 or step 501 of FIGS. 4-5). In some embodiments, step 1004 includes determining a radiant temperature, determining an air temperature for the vehicle interior, determining a convection metric for the vehicle interior, or a combination thereof. In some embodiments, the breath temperature metric includes a difference between a target breath temperature and an estimated breath temperature.

Step 1006 includes the system determining whether modification to a climate control device is necessary. For example, the system may determine whether the modification to the climate control device is necessary based the fogging metric and breath temperature metric of steps 1002 and 1004. In some embodiments, at step 1006, the system determines a fogging response, breath temperature response, or a composite response, based on steps 1002 and 1004, and then determines whether the modification is necessary. For example, if the determined response is greater than a threshold or otherwise outside of an operating range, then the system may determine that the modification is necessary. In a further example, if the response includes an adjustment in an operational control (e.g., a shaft speed, duct setting, temperature setting, valve position), or an adjustment in an operating characteristic (e.g., a measured temperature, pressure, humidity, or occupancy), then the system may determine that the modification is necessary. In some embodiments, step 1006 may be combined as part of either or both of steps 1002 and 1004. For example, a fogging response and/or breath temperature response may determined at respective steps 1002 and 1004, and thus step 1006 need not be performed separately. If the system determines the modification is necessary, the system may proceed to step 1008. If the system determines the modification is not necessary (or not necessary yet), the system may exit process 1000, continue to determine a fogging metric and breath temperature metric (e.g., based on updated data), or otherwise continue to monitor cabin conditions to determine if a modification becomes necessary.

Step 1008 includes generating a control signal response to modify an operational control of at least one climate control device associated with the vehicle. Step 1008 may generate the control signal response based on the fogging metric and the breath temperature metric. For example, step 1008 may include aspects of any or all of steps 430, 432, or 510. For example, step 1008 may include generating a control signal response by determining a heat demand metric, determining a heating rate, determining at least one of a blower duty cycle or a target air discharge temperature, or any combination thereof. In some embodiments, step 1008 includes generating the control signal response for a first climate control device of the at least one climate control device. In some such embodiments, step 1008 includes determining a first response based on the fogging metric, determining a second response based on the breath temperature metric, and comparing the first response to the second response (e.g., illustrated by steps 430 and 432 of FIG. 4, or step 510 of FIG. 5).

Step 1010 includes the system facilitating modification to the operation control of the at least one climate control device based on the control signal response of step 1008. For example, step 1010 may include aspects of step 434. In some embodiments, step 1010 includes controlling a blower, a resistance heater, a compressor, an actuated duct door, or any combinations thereof.

In an illustrative example, the system may generate the control signal response at step 1008 by classifying the fogging metric of step 1002 based on a predetermined classification scheme (e.g., as illustrated by process 700 of FIG. 7). In a further illustrative example, the system may generate the control signal response at step 1008 by determining a response metric based on a functional relationship with the fogging metric (e.g., as illustrated by the exponential functional relationship illustrated in FIG. 7). Accordingly, the operation control may include a blower duty cycle, a heater temperature, a compressor speed, an air system duct door position, or combinations thereof, as illustrated in FIG. 7.

In an illustrative example, the system may perform steps 1020 and 1004 based on inputs received. For example, the system may receive a plurality of sensor signals from a plurality of sensors. The plurality of sensors may include, for example, at least one temperature sensor, at least one relative humidity sensor, a solar flux sensor, a vehicle speed sensor, any other suitable sensor, or any combination thereof.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   determining, using control circuitry, a first response based on a fogging metric for an interior of a vehicle;
   determining, using the control circuitry, a second response based on a breath temperature metric associated with one or more passengers within the interior based on a radiant temperature, an air temperature for the interior, and a convection metric for the interior, wherein the radiant temperature is based on a windshield temperature and a cabin temperature;

generating, using the control circuitry, and based on a maximum response among the first response and the second response, a control signal response to modify an operational control of at least one climate control device associated with the vehicle; and facilitating modification to the operational control of the at least one climate control device based on the control signal response.

2. The method of claim 1, wherein the fogging metric is based on:

a relative humidity corresponding to a windshield of the vehicle;

a temperature corresponding to the windshield;

a solar flux corresponding to the windshield; and a blower duty cycle.

3. The method of claim 1, wherein determining the fogging metric is based on a dewpoint temperature corresponding to a windshield, a temperature corresponding to the windshield, and a temperature gradient corresponding to the windshield, and wherein the temperature gradient is determined based on a solar flux and a cabin air flow rate.

4. The method of claim 1, wherein generating the control signal response comprises classifying the fogging metric based on a predetermined classification scheme.

5. The method of claim 1, wherein:

generating the control signal response comprises determining a response metric based on a functional relationship with the fogging metric, wherein the functional relationship is exponential; and the operational control comprises a blower duty cycle, a heater temperature, a compressor speed, or an air system duct door position, or combinations thereof.

6. The method of claim 1, wherein:

the breath temperature metric comprises a difference between a target breath temperature and an estimated breath temperature; and generating the control signal response comprises:

determining a heat demand metric;

determining a heating rate; and determining at least one of a blower duty cycle or a target air discharge temperature, or combinations thereof.

7. The method of claim 1, wherein facilitating the modification to the operational control comprises controlling at least one of a blower, a resistance heater, a compressor, or an actuated duct door, or combinations thereof.

8. The method of claim 1, wherein:

generating the control signal response comprises, for a first climate control device of the at least one climate control device:

comparing the first response to the second response to determine the maximum response.

9. The method of claim 1, further comprising receiving a plurality of sensor signals from a plurality of sensors, wherein the plurality of sensors comprises:

at least one temperature sensor;

at least one relative humidity sensor;

a solar flux sensor; and a vehicle speed sensor.

10. A system comprising:

at least one climate control device of a vehicle;

control circuitry configured to:

determine a first response based on a fogging metric for an interior of the vehicle;

determine a second response based on a breath temperature metric associated with one or more passengers within the interior based on a radiant temperature, an air temperature for the interior, and a convection metric for the interior, wherein the radiant temperature is based on a windshield temperature and a cabin temperature;

generate, based on a maximum response among the first response and the second response, a control signal response to modify an operational control of the at least one climate control device; and facilitate modification to the operational control of the at least one climate control device based on the control signal response.

11. The system of claim 10, wherein the control circuitry is further configured to determine the fogging metric by:

determining a relative humidity corresponding to a windshield;

determining a temperature corresponding to the windshield;

determining a solar flux corresponding to the windshield; and determining a blower duty cycle.

12. The system of claim 10, wherein the control circuitry is further configured to determine the fogging metric based on a dewpoint temperature corresponding to a windshield, a temperature corresponding to the windshield, and a temperature gradient corresponding to the windshield, and wherein the temperature gradient is determined based on a solar flux and a cabin air flow rate.

13. The system of claim 10, wherein:

the control circuitry is further configured to generate the control signal response based on a response having a functional relationship with the fogging metric, wherein the functional relationship is exponential; and the response comprises a blower duty cycle, a heater temperature, a compressor speed, or an air system duct door position, or combinations thereof.

14. The system of claim 10, wherein:

the breath temperature metric comprises a difference between a target breath temperature and an estimated breath temperature; and the control circuitry is further configured to generate the control signal response based on the fogging metric and on the breath temperature metric by:

determining a heat demand metric;

determining a heating rate; and determining at least one of a blower duty cycle or a target air discharge temperature, or combinations thereof.

15. The system of claim 10, wherein the at least one climate control device comprises at least one of a blower, a resistance heater, a compressor, or an actuated duct door, or combinations thereof.

16. The system of claim 10, wherein:

the control circuitry is further configured to generate the control signal response, for a first climate control device of the at least one climate control device, by:

comparing the first response to the second response to determine the maximum response.

17. The system of claim 10, further comprising a plurality of sensors, wherein the control circuitry is further configured to receive a plurality of sensor signals from the plurality of sensors, and wherein the plurality of sensors comprises:

at least one temperature sensor;

at least one relative humidity sensor;

a solar flux sensor; and a vehicle speed sensor.

18. A non-transitory computer-readable medium having instructions encoded thereon that when executed by control circuitry cause the control circuitry to:

determine a first response based on a fogging metric for an interior of a vehicle;

determine a second response based on a breath temperature metric associated with one or more passengers within the interior based on a radiant temperature, an air temperature for the interior, and a convection metric for the interior, wherein the radiant temperature is based on a windshield temperature and a cabin temperature;

generate, based on a maximum response among the first response and the second response, a control signal response to modify an operational control of at least one climate control device associated with the vehicle; and facilitate modification to the operational control of the at least one climate control device based on the control signal response.

19. The method of claim 1, wherein determining the first response comprises determining a time scale of the first response based on the fogging metric, wherein the time scale affects how quickly the control signal response responds to the fogging metric.

20. The system of claim 10, wherein the control circuitry is further configured to determine the first response by determining a time scale of the first response based on the fogging metric, wherein the time scale affects how quickly the control signal response responds to the fogging metric.

* * * * *